Feb. 13, 1940. C. E. GEISER 2,190,542
HYDRAULICALLY OPERATED CLUTCH
Filed July 25, 1936 2 Sheets-Sheet 1
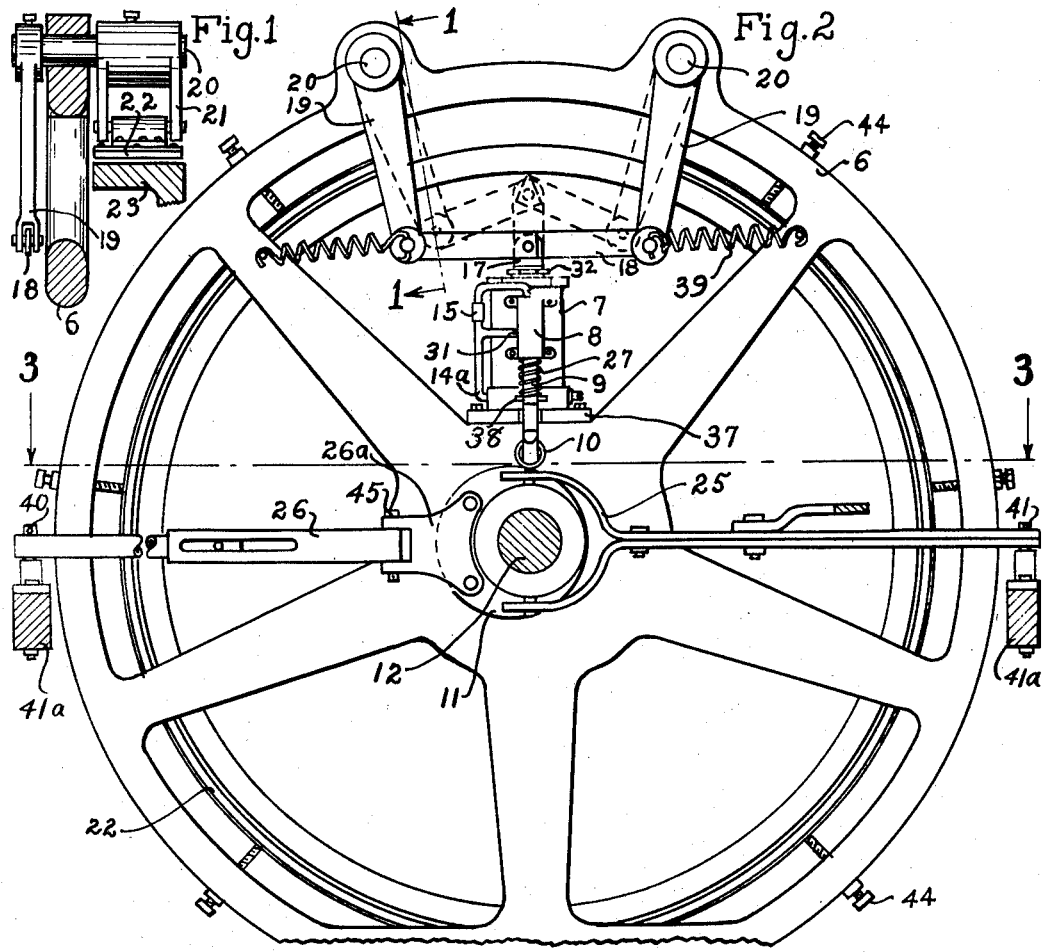
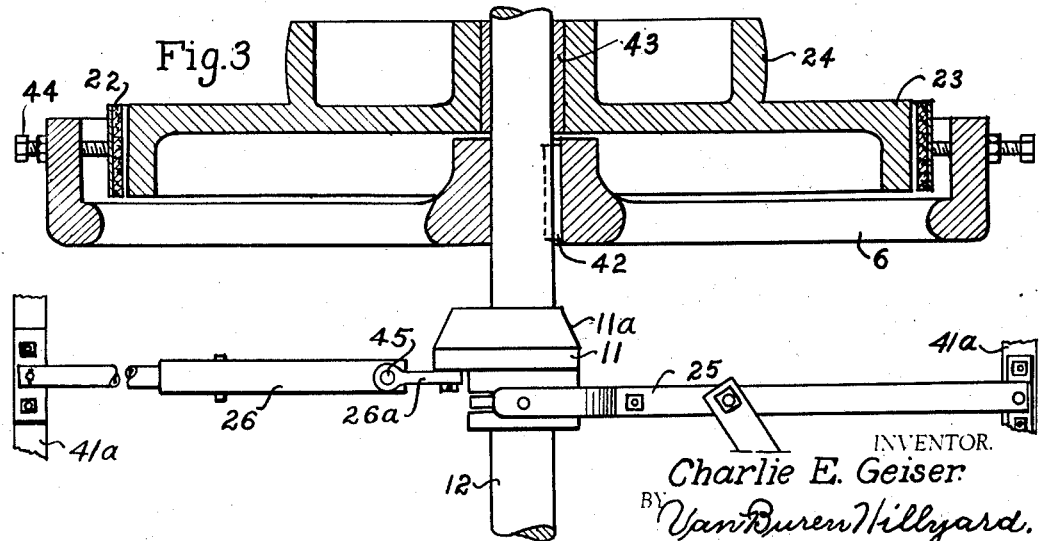
INVENTOR.
Charlie E. Geiser.
BY Van Buren Hillyard.
ATTORNEY.

Feb. 13, 1940.  C. E. GEISER  2,190,542
HYDRAULICALLY OPERATED CLUTCH
Filed July 25, 1936  2 Sheets-Sheet 2
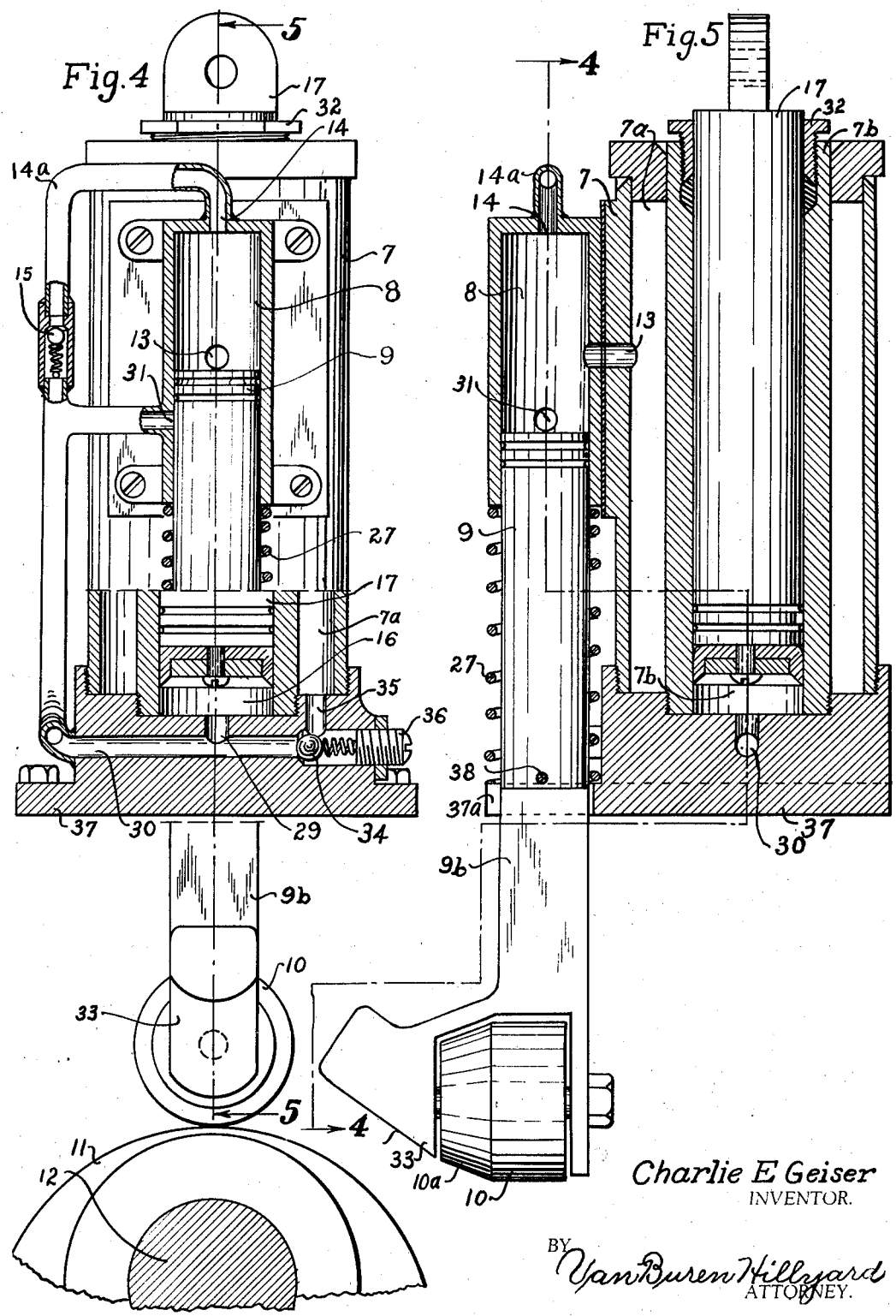
Charlie E Geiser
INVENTOR.
BY Van Buren Hillyard
ATTORNEY.

Patented Feb. 13, 1940

2,190,542

UNITED STATES PATENT OFFICE 2,190,542

HYDRAULICALLY OPERATED CLUTCH

Charlie E. Geiser, Wichita Falls, Tex.

Application July 25, 1936, Serial No. 92,681

6 Claims. (Cl. 192—85)

The present invention provides a clutch adapted to be operated by fluid pressure, preferably liquid, in which the mechanism is self-contained and mounted on the clutch, thereby materially simplifying the construction and obviating the necessity of pipe connections, joints and a great number of parts.

The invention is directed to a clutch of the nature aforesaid including a pump, a hydraulic motor, coacting friction members and actuating means, all mounted upon a supporting rotating drive member in compact arrangement for economy of construction, few parts and convenience and dependability of operation.

The invention also provides a pressure relief valve that makes it possible to set a maximum operating pressure on the motor.

The invention further provides a pump plunger that is utilized for the dual purpose of closing passages and as a piston of the pump.

While the drawings illustrate a preferred embodiment of the invention, it is to be understood that in adapting the same to meet specific needs and requirements, the design may be varied and changes in the minor details of construction may be resorted to within the scope of the invention as claimed, without departing from the spirit thereof.

For a full understanding of the invention and the merits thereof, reference is to be had to the following description and the drawings hereto attached, in which:

Figure 1 is a sectional detail view on the line 1—1 of Figure 2.

Figure 2 is an elevation of a clutch illustrative of an embodiment of the invention, parts being in section and parts being broken away.

Figure 3 is a horizontal sectional view on the line 3—3 of Figure 2.

Figure 4 is a sectional detail view on the line 4—4 of Figure 5.

Figure 5 is an enlarged section of the pump and hydraulic motor on the line 5—5 of Figure 4.

Corresponding and like parts are referred to in the following description and designated in the several views of the drawings by like reference characters.

The numeral 12 designates a drive shaft upon which are mounted a drive member 6, keyed or otherwise fastened thereto as at 42, and a driven member 23 provided with a pulley 24. The member 6 functions as a support for the pump and hydraulic motor which are mounted thereon. The friction band 22 and operating mechanism are likewise mounted on the member 6, these rotate at all times when connected to a source of power. Parallel shafts 20, mounted in the part 6 are provided with arms 19 and 21. The ends of the friction band 22 are attached to the arms 21, as shown most clearly in Figure 1. Links 18 pivotally connect the arms 19. Springs 39 connect the arms 19 with the part 6 and normally exert an outward pull on said arms. The inner ends of the links 18 are pivotally connected to the outer end of the plunger 17 of the hydraulic motor. The friction band 22 coacts with the member 23 which constitutes a friction drum. Set screws 44 provide uniform adjustment of the friction band, as will be readily appreciated.

A base 37, bolted to the member 6, supports the pump and motor. A casing 7 is mounted on the base 37 and houses cylinder 7b in which is fitted the plunger 17. A pump cylinder 8 is attached to the casing 7 and receives a plunger 9, the lower portion 9b of which is square and operates in an opening 37a in the base. A spring 27 is mounted on the pump plunger between the lower end of the cylinder 8 and a pin 38 passing through the plunger normally tending to hold the plunger projected. The pin 38 also serves as a stop to engage the base 37 and limit the projection of the plunger 9. An opening 13 connects the pump cylinder with the casing 7 and chamber 7a formed in said casing around the cylinder 7b. A pipe 14a connects an opening 14 in the top of the cylinder 8 with a passage 30 formed in the base 37. This pipe 14a also connects with the cylinder 8 at 31 and is provided with a check valve 15 normally seated to prevent pressure passing from pipe 14a through opening 14 into cylinder 8. An opening 29 connects the passage 30 with the lower end of the cylinder 7b. An opening 35 connects the passage 30 with the chamber 7a and a check valve 34 permits excess pressure to escape through said opening 35. The valve 34 is held seated by spring pressure which is regulable by means of set screw 36.

An eccentric 11 is loose upon the drive shaft 12 and is shiftable thereon by means of a forked arm 25 pivoted at 41 to a suitable frame 41a. A lug 26a is attached to the eccentric 11 and is pivoted at 45 to a telescoping connection 26 which is pivoted at 46 to the frame 41a. In this manner, the eccentric 11 is prevented from turning and is free to move on the shaft 12. The projecting end 9b of the plunger 9 is provided with a roller 10 to engage and ride on the eccentric 11 and with a projection 33 which has an inclined face to facilitate engagement of the eccentric with the roller 10 when shifting the eccentric into engaging position. The confronting portions of the roller 10 and eccentric 11 are inclined, or tapered, as indicated at 10a and 11a, to facilitate their riding into engagement.

In assembling the unit for use, the reservoir 7a is partially filled nearly full with liquid, such as oil, leaving a slight air space in the top thereof. When the eccentric 11 is clear of the roller 10 the piston 9 is in the position, shown in Figure 5, and opens port 31; the clutch is then released or free. When the eccentric 11 is shifted to engage the roller 10 which is carried by the rotating drive member 6, the piston 9 is moved thereby to the position shown in Fig. 4; then the pump and motor revolve about the eccentric 11 with the result that the pump plunger 9 has a reciprocatory movement imparted thereto from a point just below the port 13 to a point spaced below the top of the cylinder 8 above the port 13. On the out stroke of the cylinder with the pump, liquid is drawn by suction into the cylinder 8 from the storage chamber 7a through the opening 13, as is most clearly shown in Figure 4. On the in stroke plunger 9 closes opening 13 and the liquid is forced from the cylinder 8 through the opening 14, past check valve 15 in the pipe 14a, passage 30 and opening 29, into the cylinder 7b. This moves the plunger 17 outward to break the links outwardly, as shown by the dotted lines in Figure 2, to set the clutch to cause the parts 6, 23 and 12 to rotate in unison. The working stroke of the plunger 17 is very short, whereby only a small amount of liquid will be withdrawn from the reservoir 7a and a slight vacuum will be created therein. The piston 9 is forced inward by a spring 27, and in so doing, a partial vacuum is created in cylinder 8 and upon the uncovering of port 13 the cylinder will be partially filled with liquid drawn from reservoir 7a, as the suction in cylinder 8 will be greater than in reservoir 7a.

In the operation of the device, the liquid is thrown toward the outer periphery of the rim by centrifugal force. Therefore, the liquid that enters the cylinder 8 is thrown into the upper portion of the cylinder and is exhausted by the stroke of the piston 9. However, in operation, all of the air will not be expelled from this cylinder and some air will remain therein which will expand sufficiently under the tension of the spring 27 to permit the piston 9 to return to its lowermost position. It is an advantage to have a slight vacuum in the reservoir 7a, as it will accelerate the return of the plunger 17 when the port 31 is opened to permit the return of fluid to the reservoir. The plunger 17 is shown in dotted lines in Fig. 2 in an exaggerated position to amplify the operation of the clutch arms. Upon shifting the eccentric 11 to clear the roller 10, the spring 27 moves the plunger 9 inwardly of the clutch and releases the clutch through the action of the springs 39, causing the plunger 17 to move inward, the liquid passing from cylinder 7b through opening 31, thence from cylinder 8 through opening 13 into the storage chamber 7a.

Having thus described the invention, what I claim is:

1. In combination with a friction clutch and mounted thereon, a hydraulic unit comprising a motor, a pump mounted on said motor, an eccentric to actuate said pump, means to shift said eccentric into and out of actuating position, and control means to effect a by-pass of liquid to disengage the clutch.

2. In combination with a friction clutch and mounted thereon, a hydraulic unit comprising a motor, a pump mounted upon said motor, an eccentric held against rotation to actuate said pump, said eccentric being tapered substantially in conical shape, and means to slide the eccentric into and out of engagement with said pump.

3. In combination with a friction clutch and mounted thereon, a hydraulic unit comprising a motor, a pump mounted upon said motor, an eccentric to actuate said pump, a telescoping pivoted arm to permit lateral movement of the eccentric and to hold the eccentric against rotation, and means to slide the eccentric into and out of engagement with said pump.

4. In combination with a friction clutch and mounted thereon, a hydraulic unit comprising a motor, a pump mounted on said motor, a pair of levers connected to said motor to actuate a friction band, an eccentric to actuate said pump, means to slide the eccentric into and out of engagement with said pump, and a telescoping pivoted arm to hold the eccentric against rotation and to permit lateral movement thereof.

5. In a clutch of the character specified, the combination with coacting clutch members, of a hydraulic motor mounted on the clutch, a pump connected with the motor and movable therewith, a non-rotatable eccentric for operating the pump mounted in line with the axis of the clutch, and means for moving the eccentric toward and away from the plane of the clutch to throw the pump into and out of action.

6. In a clutch actuating means, the combination of a hydraulic cylinder, a plunger therein, a pump cylinder, a plunger in the pump cylinder, a liquid storage chamber having connection with one end of the pump cylinder and the opposite end of the hydraulic cylinder and connected with the pump cylinder intermediate its ends, check valves controlling the flow of liquid between said cylinders and storage chamber, said clutch actuating means having an independent connection between the storage chamber and the pump cylinder.

CHARLIE E. GEISER.